US011050961B2

United States Patent
Nie et al.

(10) Patent No.: US 11,050,961 B2
(45) Date of Patent: Jun. 29, 2021

(54) HIGH SCANNING FREQUENCY CMOS-TDI IMAGE SENSOR

(71) Applicant: Tianjin University, Tianjin (CN)

(72) Inventors: Kaiming Nie, Tianjin (CN); Suying Yao, Tianjin (CN); Jiangtao Xu, Tianjin (CN); Zhiyuan Gao, Tianjin (CN); Zaifeng Shi, Tianjin (CN); Jing Gao, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 14/916,566

(22) PCT Filed: Dec. 12, 2014

(86) PCT No.: PCT/CN2014/093752
§ 371 (c)(1),
(2) Date: Mar. 3, 2016

(87) PCT Pub. No.: WO2016/041273
PCT Pub. Date: Mar. 24, 2016

(65) Prior Publication Data
US 2017/0180667 A1 Jun. 22, 2017

(30) Foreign Application Priority Data
Sep. 15, 2014 (CN) .......................... 201410470253.5

(51) Int. Cl.
*H04N 5/374* (2011.01)
*H04N 5/3745* (2011.01)
(Continued)

(52) U.S. Cl.
CPC ........... *H04N 5/3743* (2013.01); *H04N 5/353* (2013.01); *H04N 5/378* (2013.01); *H04N 5/3745* (2013.01); *H04N 5/37452* (2013.01)

(58) Field of Classification Search
CPC ... H04N 3/1525; H04N 3/1581; H04N 5/3743
(Continued)

(56) References Cited

U.S. PATENT DOCUMENTS 7,268,814 B1 * 9/2007 Pain ..................... H04N 5/3575
348/294
7,796,174 B1 * 9/2010 Harwit ............... H04N 5/37206
348/311
(Continued)

FOREIGN PATENT DOCUMENTS

CN    101883221 A    11/2010
CN    102595060 A    7/2012
(Continued)

OTHER PUBLICATIONS

"In-Pixel Charge Addition Scheme Applied in Time-Delay Integration CMOS Image Sensors", Xu Chao et al. Tianjin University and Springer vol. 19 No. 2 pp. 140-146, Dec. 31, 2013, Tianjin, China.
(Continued)

*Primary Examiner* — Anthony J Daniels
(74) *Attorney, Agent, or Firm* — George G. Wang; Bei & Ocean

(57) ABSTRACT

The present invention relates to technical field of analog integrated circuit design. TDI function is better realized by CMOS image sensor and it improves scanning frequency of the CMOS-TDI image sensor and extends application range of TDI technique. To this end, the present invention proposes a technical solution of high scanning frequency CMOS-TDI image sensor. The pixels include a photodiode, an operational amplifier, integration capacitors C1 and C2 of the same capacitance, an offset voltage removing capacitor C3, and plural switches S1-S10. The anode of the photodiode is connected to a zero voltage ground wire, while the cathode thereof is connected to one end of the switch S9. The other end of the switch S9 is connected to a reference
(Continued)

voltage $V_{ref}$. The above pixels are cascaded and an output end of the last pixel is connected to a column-parallel ADC through a readout switch Read. The invention mainly applies to analog integration circuit design.

4 Claims, 4 Drawing Sheets

(51) Int. Cl.
    *H04N 5/353*     (2011.01)
    *H04N 5/378*     (2011.01)

(58) Field of Classification Search
    USPC ........................................................ 348/295
    See application file for complete search history.

(56) References Cited

U.S. PATENT DOCUMENTS

| | | | | |
|---|---|---|---|---|
| 8,120,683 | B1* | 2/2012 | Turner | H04N 5/32 |
| | | | | 348/295 |
| 2008/0217661 | A1 | 9/2008 | Lauxtermann | |
| 2009/0009645 | A1* | 1/2009 | Schrey | H04N 5/3743 |
| | | | | 348/308 |
| 2011/0019044 | A1* | 1/2011 | Wang | H04N 5/37206 |
| | | | | 348/295 |
| 2013/0194445 | A1* | 8/2013 | Brown | H04N 5/378 |
| | | | | 348/222.1 |
| 2017/0180666 | A1* | 6/2017 | Nie | H04N 5/3745 |

FOREIGN PATENT DOCUMENTS

| | | |
|---|---|---|
| CN | 102595066 A | 7/2012 |
| CN | 102595068 A | 7/2012 |
| JP | 2012060411 A | 3/2012 |

OTHER PUBLICATIONS

"A Dynamic Range Extension Scheme Applied to a TDI CMOS Image Sensor", Xu Chao et al. Journal of Semiconductors, 024013:1, Jan. 28, 2014, Beijing, China.

* cited by examiner

HIGH SCANNING FREQUENCY CMOS-TDI IMAGE SENSOR

CROSS-REFERENCE TO RELATED APPLICATIONS

This application claims priority from CN Application No. CN201410470253.5, filed Sep. 15, 2014 and PCT Application No. PCT/CN2014/093752, filed Dec. 12, 2014, the contents of which are incorporated herein in the entirety by reference.

TECHNICAL FIELD

The present invention relates to the technical field of analog integrated circuit design and more particularly, relates to design of a CMOS-TDI image sensor capable of realizing higher scanning frequency, that is, a high scanning frequency CMOS-TDI image sensor.

BACKGROUND ART

An image sensor is able to transform optical signals acquired by a lens to electrical signals which are easy to be stored, transferred, and processed. In terms of an operation manner, image sensors may be classified into the area type and the linear type. The working principle of an area image sensor is as follows: photos of an object are taken according to the pixel matrix of a two dimensional area so as to obtain the two dimensional image information, whereas the working principle of a linear image sensor is: photos of the object are taken according to the pixel matrix of one dimension and by scanning the object to get the two dimensional image information. The working manner of a linear image sensor is demonstrated in FIG. 1. The linear image sensor works in a special manner and therefore it is widely applied in kinds of fields such as aerial photography, space imaging, machine vision, medical imaging, and so on. However, as the object keeps moving during pixel exposure of the linear image sensor, the exposure period of pixels is seriously limited by the moving speed of the linear image sensor corresponding to the object to which pictures are taken. In particular, in case of a high movement and low illumination environment (for example in space imaging), the SNR (signal to Noise Ratio) of the linear image sensor will become very low. To resolve the problem of low SNR, a time delay integration (TDI) has been proposed. It is able to increase the SNR and sensitivity of the linear image sensor and it uses a special scanning manner to expose the same object several times, thus realizing a higher SNR and sensitivity. As such, it is suitable for an environment of high movement and low illumination. The basic principles of TDI lie in the linear scanning with an area pixel matrix, thus realizing multiple exposuers of the same moving object by pixels of different lines, and accumulating of the exposure result of each time. This equivalently extends the exposure integration time of the object, thereby greatly improving the SNR and sensitivity.

In early stages, the TDI technique is implemented using a charge coupled device (CCD) image sensor which is also an ideal device for implementing the TDI technique. It can realize accumulation of signals without noise. Currently, the TDI technique mostly applies to CCD image sensors. A widely used CCD-TDI image sensor has the structure similar to a rectangular area CCD image sensor and performs linear scanning. Shown as FIG. 2, the operation of a CCD-TDI image sensor is as follows: a N-leveled CCD-TDI image sensor has n lines of pixels; the charges collected during a first exposure period by pixels of the first line of a row are not output directly, they are added to the charges collected during a second exposure period by a second pixel located at the same row. By the same token, the charges collected by the pixels of the last line (the $n^{th}$ line) of the CCD-TDI image sensor are added into the charges collected during the $n-1^{th}$ line and are read out according to the output manner of a normal linear CCD device. For a CCD-TDI image sensor, the amplitude of output signals is the accumulation of integration charges of n pixels. It is equivalent to the charges of a pixel collected during n times of the exposure time. The output signal amplitude is increased by n times while the noise amplitude is increased only by $\sqrt{n}$ times and accordingly, SNR may be improved by $\sqrt{n}$ times.

However, as a CCD image sensor has the disadvantages such as large power consumption and low integration, applications in various fields of the CCD image sensor have been gradually replaced by the CMOS (Complementary Metal Oxide Semiconductor) image sensor. If the TDI function can be realized by the CMOS image sensor (i.e., CMOS-TDI image sensor), the cost of a TDI camera will be decreased dramatically and find its wide application. In the prior art, to realize the TDI function using a CMOS image sensor, analog signal accumulators are incorporated into the CMOS image sensor to work as a CMOS-TDI image sensor. That is, analog signals output by the pixels are in advance input into the analog signal accumulator to realize accumulation of the identically exposed signals, and the accumulated analog signals are sent to the ADC to be output quantitatively. Furthermore, the prior art has also proposed to quantitatively output signals of the CMOS image sensor through the ADC at first and then, finish accumulation of identically exposed signals by a digital domain accumulator built in chip. These two kinds of techniques, either performing accumulation and then quantitative output or performing quantification and then accumulative output, require reading out of the exposure result of all pixels of the CMOS image sensor during a single exposure period. As a result, the readout speed certainly will limit the shortest exposure period, i.e., the largest scanning frequency. To eliminate this problem, the prior art has proposed integration of a buffer cell into the pixels to realize signal delivery between adjacent pixels. Similar to the CCD type TDI image sensor capable of realizing accumulation of signals in a pipelined manner, only the output of the last line of pixels during each exposure time needs to be read out quantitatively. Accordingly, the limitation of the scanning frequency caused by the readout speed is eliminated, thereby realizing a faster scanning frequency. This technique, however, during the pipelined accumulation of pixel output signals, will introduce a great deal of kT/C noise and offset voltage of the operational amplifier. In addition, the fill factor of pixels is decreased due to the integration of buffer cells into the pixels, hence limiting the sensitivity of the sensor.

SUMMARY OF THE INVENTION

The present invention is intended to overcome drawbacks of the prior art and to better realize the TDI function of CMOS image sensors, improve the scanning frequency of the CMOS-TDI image sensor, and extend the application range of the TDI technique. To these ends, the present invention proposes a technical solution of a high scanning frequency CMOS-TDI image sensor. It includes a photodiode, an operational amplifier, integration capacitors C1 and C2 of the same capacitance, an offset voltage removing capacitor C3, and plural switches S1-S10. The anode of the photodiode is connected to a zero voltage ground wire, while the cathode thereof is connected to one end of the switch S9. The other end of the switch S9 is connected to a reference voltage $V_{ref}$. A left electrode plate of the offset voltage removing capacitor C3 is coupled to the cathode of the photodiode, whereas a right electrode thereof is coupled to a negative input end of the operational amplifier. The switch S10 is connected between the negative input end and an output end of the operational amplifier in series. A positive input end of the operational amplifier is coupled to the reference voltage $V_{ref}$. The output end of the operational amplifier also works as the output end of entire pixels. The left electrode plate of the integration capacitor C1 is connected to one end of each switch S1 and S3. The other end of the switch S1 is connected to the reference voltage $V_{ref}$, the other end of the switch S3 is connected to the cathode of the photodiode. The right electrode plate of the integration capacitor C1 is connected to one end of each switch S2 and S4. The other end of the switch S2 is connected to an input end of the pixel, and the other end of the switch S4 is connected to an output end of the pixel. The left electrode plate of the integration capacitor C2 is connected to one end of each switch S5 and S7. The other end of the switch S5 is connected to the reference voltage $V_{ref}$, and the other end of the switch S7 is connected to the cathode of the photodiode. The right electrode plate of the integration capacitor C2 is connected to one end of each switch S6 and S8. The other end of the switch S6 is connected to an input end of the pixel, and the other end of the switch S8 is connected to an output end of the pixel. The cascading manner of the above pixels is described as follows: an input end of pixel 1 is connected to the reference voltage $V_{ref}$, an input end of pixel 2 is connected to an output end of pixel 1 and then cascading by the similar manner; an output end of the last pixel is connected to a column-parallel ADC through a readout switch Read.

The switches S1 and S2 are controlled by the clock clk1', the switches S3 and S4 are controlled by the clock clk2, the switches S5 and S6 are controlled by the clock clk2', the switches S7 and S8 are controlled by the clock clk1, while the switches S9 and S10 are controlled by the clock rst. When the clock Read is at a high level, the pixel output is valid. The following operation of pixels is done in a pipelined manner: sample the input signal, and then add the sampled signal to the photocurrent integration signal generated during an exposure period of the pixel, output the accumulation result and express the output $V_{int}$ as:

$$V_{int} = V_{ref} + V_0 + \frac{\int_0^{T_{int}} i_{ph} dt}{C1} \quad (1)$$

Wherein $V_0$ is the signal collected during the previous exposure period of the pixel, and $i_{ph}$ is the photocurrent value of the photodiode.

The operating procedure of the pixel is described as follows:

In the initializing status, clk1=clk2=0, clk1'=clk2'=rst=1, the input and output voltage of all pixels are $V_{ref}$ by this time. After that, all the pixels are subject to a first exposure period, and here, clk1=clk1'=1, clk2=clk2'=rst=0, the integration capacitor C1 of each pixel begins to collect the output signal of its previous pixel and at the same time, the integration capacitor C2 begins to integrate photocurrent of the photodiode. When the first exposure period ends, the signal stored in the integration capacitor C2 of $x^{th}$ pixel is $V_{int(1,x)}$, and the signal stored in the integration capacitor C1 thereof is $V_{int(1,x-1)}$. And then, all the pixels are subject to a resetting status and here, clk1=clk1'=clk2=clk2'=0, rst=1, and the integration capacitors C1 and C2 of each pixel are in a floating status by this time and signals stored in these capacitors are kept unchanged. Resetting action is done to the photodiode. After that, all the pixels are subject to a second exposure period and here, clk1=clk1'=rst=0, clk2=clk2'=1, the integration capacitor C2 of each pixel begins to collect the output signal of its previous pixel and at the same time, the integration capacitor C1 begins to integrate photocurrent of the photodiode. When the second exposure period ends, the signal stored in the integration capacitor C1 of $x^{th}$ pixel is $V_{int(1,x-1)}+V_{int(2,x)}$, and the signal stored in the integration capacitor C2 thereof is $V_{int(1,x-2)}+V_{int(2,x-1)}$. By the similar manner, after exposure of N times, the output of the $Nt^h$ pixel can be expressed as:

$$V_{int\_tot}=V_{int(1,1)}+V_{int(2,2)}+V_{int(3,3)}+ \ldots +V_{int(N,N)} \quad (2)$$

Wherein, from $V_{int(1,1)}$ to $V_{int(N,N)}$, each represents the exposure result of the same object during a respective transit time from 1 to N by a respective pixel from 1 to N. Accordingly, the output of the $N^{th}$ pixel is the result of N-leveled integration accumulation. This result is quantitatively output by a subsequent column-parallel ADC during a high level period of the clock Read, thus completing the entire reading out process. During each exposure period, the output of the $N^{th}$ pixel is the result of N times integration accumulation.

The layout is denoted below.

A square with a central distance P is a photosensitive region of the photodiode, and a laterally adjacent square with the same size is the location where the operational amplifier, switches and capacitor layout are disposed and it is called as the circuitry region. Every two laterally adjacent squares constitute a layout of a pixel. Pixels of the odd column are not laterally adjacent to those of the even column. The pixels of the even column entirely locate below the pixels of the odd column. The photosensitive region of pixels of the even column is aligned with the circuitry region of the pixels of the odd column. Except for the first column, the photosensitive region of pixels of the odd column is aligned with the circuitry region of the pixels of the even column. Consequently, along a direction perpendicular to the scanning direction, that is, the length direction of the sensor array, a photosensitive region of which the fill factor is almost 100% is disposed at every distance of P.

The present invention has the following features and good effects.

The pixel structure of the CMOS-TDI image sensor is able to realize the transfer of the output signal of previous pixels to next pixels at the exposure time, and obtained the pipelined accumulation of exposure result to the same object by the pixels of the same column. In each exposure period, the output of the last line pixels is required to be read out, thus decreasing the limitation of the shortest exposure time imposed by the readout speed, and improving the largest scanning frequency of the sensor. The offset isolation technique is applied to the pixels to remove offset voltage. In addition, only one sampling operation is introduced in the course of receiving forwarded pixel output signals, thus reducing the introduced thermal noise. The layout suitable for this pixel structure may significantly improve the fill factor of the pixel photosensitive region without decreasing the equivalent central distance of the pixels. The instant invention may better realize the TDI function, improve the scanning frequency of the CMOS-TDI image sensor, and expand the application range of the TDI technique.

DETAILED DESCRIPTION OF THE INVENTION

Figure 1:
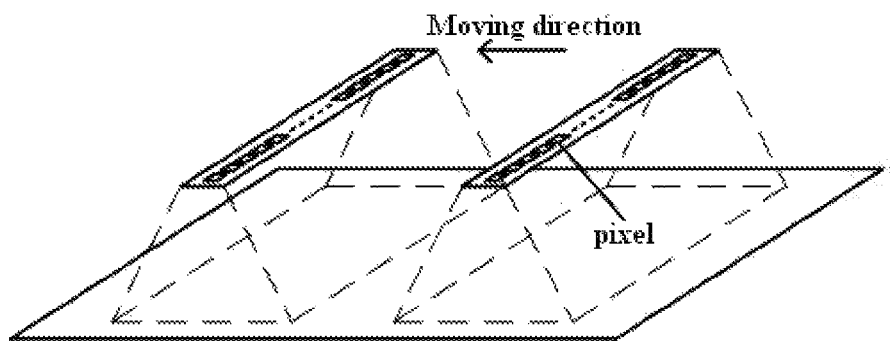
FIG. 1 shows a schematic operation manner of a prior art linear image sensor.
Figure 2:
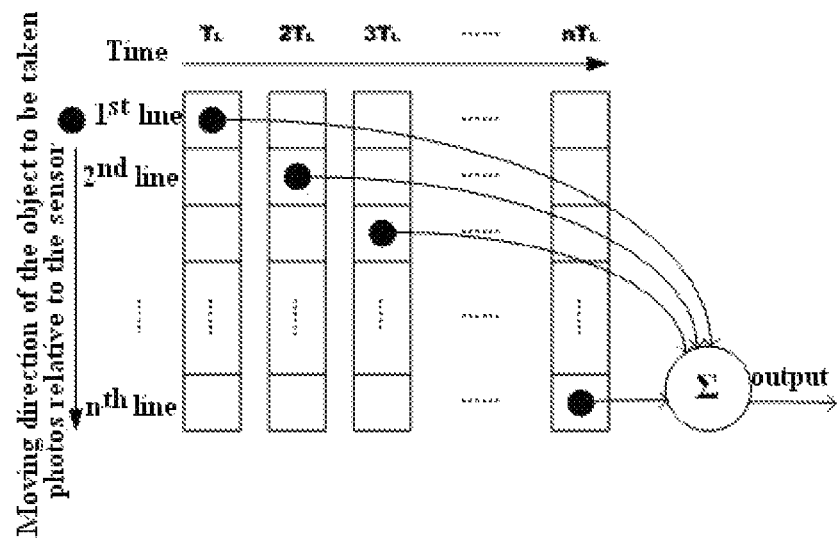
FIG. 2 shows a schematic operation manner of a prior art CCD-TDI image sensor.
Figure 3:
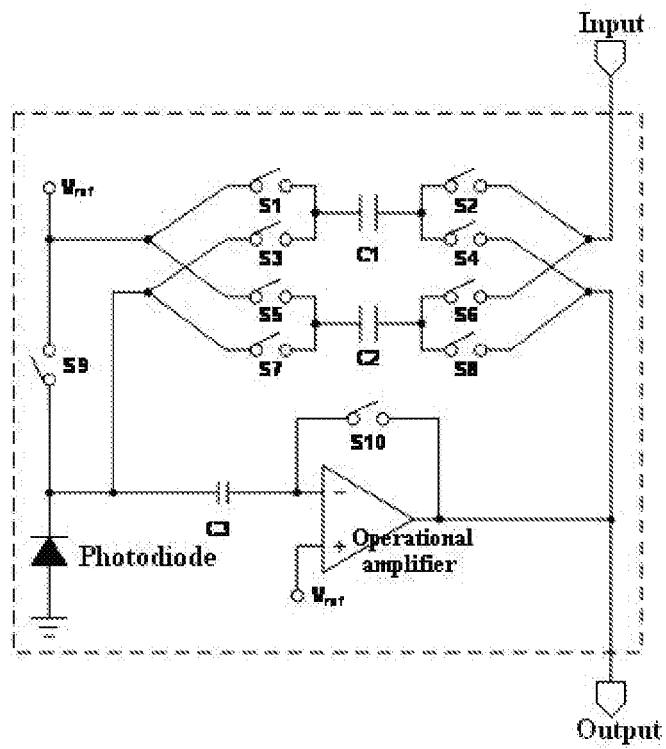
FIG. 3 shows a pixel circuit diagram employed by a high scanning frequency CMOS-TDI image sensor of the present invention.
Figure 4:
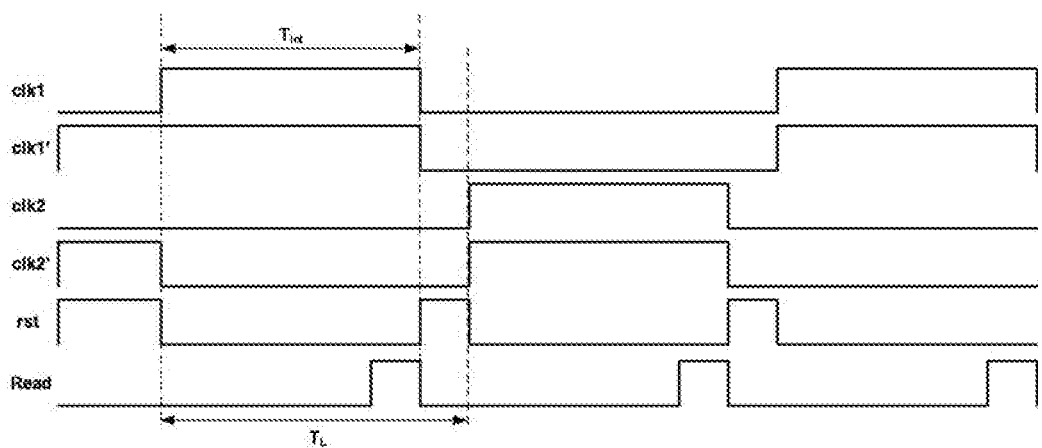
FIG. 4 indicates a schematic pixel timing sequence control of the present invention.

The pixel structure employed by a CMOS-TDI image sensor of the present invention is illustrated in FIG. 3. It mainly includes a photodiode, an operational amplifier, integration capacitors C1 and C2 (of the same capacitance value), an offset voltage removing capacitor C3, and plural switches S1-S10. These components of the pixel have the connection relationship as denoted below. The anode of the photodiode is connected to a ground wire (0V), while the cathode thereof is connected to one end of the switch S9, the other end of the switch S9 is connected to a reference voltage $V_{ref}$. A left electrode plate of the offset voltage removing capacitor C3 is coupled to the cathode of the photodiode, whereas a right electrode thereof is coupled to a negative input end of the operational amplifier. The switch S10 is connected between the negative input end and an output end of the operational amplifier in series. A positive input end of the operational amplifier is coupled to the reference voltage $V_{ref}$. The output end of the operational amplifier also works as the output end of entire pixels. The left electrode plate of the integration capacitor C1 is connected to one end of each switch S1 and S3, the other end of switch S1 is connected to the reference voltage V ref, and the other end of the switch S3 is connected to the cathode of the photodiode. The right electrode plate of the integration capacitor C1 is connected to one end of each switch S2 and S4. The other end of the switch S2 is connected to an input end of the pixel, the other end of the switch S4 is connected to an output end of the pixel. The left electrode plate of the integration capacitor C2 is connected to one end of each switch S5 and S7. The other end of the switch S5 is connected to the reference voltage $V_{ref}$, the other end of the switch S7 is connected to the cathode of the photodiode. The right electrode plate of the integration capacitor C2 is connected to one end of each switch S6 and S8. The other end of the switch S6 is connected to an input end of the pixel, the other end of the switch S8 is connected to an output end of the pixel. The controlling timing sequence of the switches S1-S10 is shown in FIG. 4. Wherein, $T_L$ is transit time, $T_{int}$ is pixel exposure time, the high level indicates turning on of the switches, while the low level indicates turning off thereof. Also, the switches S1 and S2 are controlled by the clock clk1', the switches S3 and S4 are controlled by the clock clk2, the switches S5 and S6 are controlled by the clock clk2', the switches S7 and S8 are controlled by the clock clk1, while the switches S9 and S10 are controlled by the clock rst. When the clock Read is at the high level, the pixel output is valid. Under the control of the timing sequence of FIG. 4, the pixel structure of FIG. 3 may perform the following actions in a pipelined manner: sample the input signal, and then add the sampled signal to the photocurrent integration signal generated during an exposure period of the pixel, output the accumulation result and express the output $V_{int}$ as:

$$V_{int} = V_{ref} + V_0 + \frac{\int_0^{T_{int}} i_{ph} dt}{C1} \quad \text{(formula 1)}$$

Wherein $V_0$ is the signal collected during the previous exposure period of the pixel, and $i_{ph}$ is the photocurrent value of the photodiode. The offset voltage removing capacitor C3 of the pixel has the ability of isolating integration capacitors C1 and C2 from the operational amplifier offset voltage. As a result, the integration result output by the pixel contains no offset voltage of the operational amplifier. Moreover, only one input signal sampling operation is introduced in the course of signal accumulation by the pixel. That is, sampling thermal noise is introduced only once, thus reducing the thermal noise level during the accumulated readout.

Figure 5:
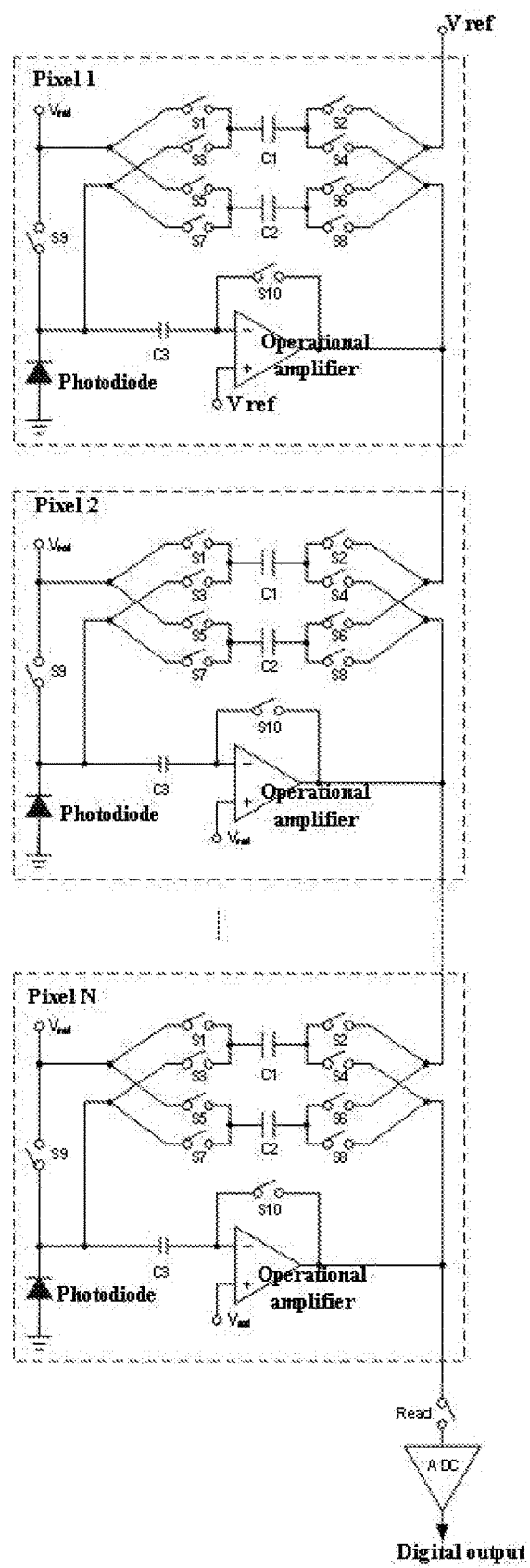
FIG. 5 shows a circuit diagram of pixels of a single column of the present invention.

TDI signal accumulation function is achieved by cascading these pixels. A single column of pixels after cascading N pixels is illustrated in FIG. 5. Here, an input end of pixel 1 is connected to the reference voltage $V_{ref}$, an input end of pixel 2 is connected to an output end of pixel 1 and then cascading by the similar manner; and finally, an output end of the last pixel is connected to a column-parallel ADC through a readout switch Read. The operating procedure of the pixel is described as followed. In the initializing status, (clk1=clk2=0, clk1'=clk2'=rst=1), the input and output voltage of all pixels are $V_{ref}$ by this time, a resetting action is finished for integration capacitors C1 and C2 of all pixels, and a resetting action is also applied to the photodiode. After that, all the pixels are subject to a first exposure period (clk1=clk1'=1, clk2=clk2'=rst=0), the integration capacitor C1 of each pixel begins to collect the output signal of its previous pixel and at the same time, the integration capacitor C2 begins to integrate photocurrent of the photodiode. When the first exposure period ends, the signal stored in the integration capacitor C2 of $x^{th}$ pixel is $V_{int(1,x)}$, and the signal stored in the integration capacitor C1 thereof is $V_{int(1,x-1)}$. Next, all the pixels are subject to a resetting status (clk1=clk1'=clk2=clk2'=0, rst=1), the integration capacitors C1 and C2 of each pixel are in a floating status by this time and signals stored in these capacitors are kept unchanged. Resetting action is applied to the photodiode. After that, all the pixels are subject to a second exposure period (clk1=clk1'=rst=0, clk2=clk2'=1), the integration capacitor C2 of each pixel begins to collect the output signal of its previous pixel and at the same time, the integration capacitor C1 begins to integrate photocurrent of the photodiode. When the second exposure period ends, the signal stored in the integration capacitor C1 of $x^{th}$ pixel is $V_{int(1,x-1)}+V_{int(2,x)}$, and the signal stored in the integration capacitor C2 thereof is $V_{int(1,x-2)}+V_{int(2,x-1)}$. By the similar manner, after exposure of N times, the output of the $N^{th}$ pixel may be expressed as:

$$V_{int\_tot}=V_{int(1,1)}+V_{int(2,2)}+V_{int(3,3)}+\ldots+V_{int(N,N)} \quad \text{(formula 2)}$$

Wherein, from $V_{int(1,1)}$ to $V_{int(N,N)}$, each represents the exposure result of the same object during a respective transit time from 1 to N by a respective pixel from 1 to N. Accordingly, the output of the $N^{th}$ pixel is the result of N-leveled integration accumulation. This result is quantitatively output by a subsequent column-parallel ADC during a high level period of the clock Read, thus completing the entire reading out process. During each exposure period, the output of the $N^{th}$ pixel is the result of N times integration accumulation. Therefore, the ADC only needs to perform readout once thus reducing the limitation on the scanning frequency imposed by the readout speed. A readout time of a microsecond level can lead to a scanning frequency of hundreds of KHz.

Figure 6:
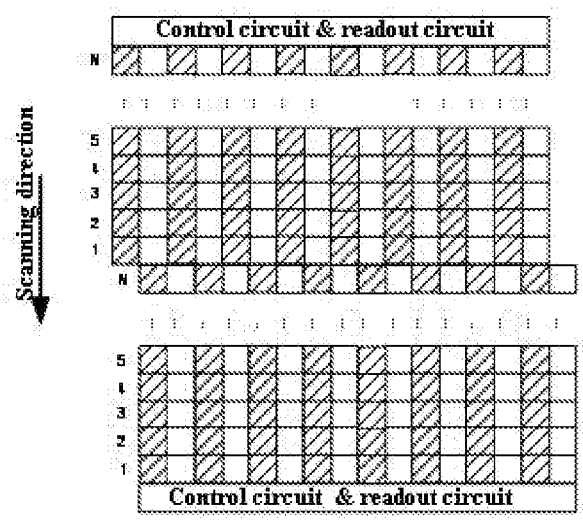
FIG. 6 shows a schematic layout view of the pixel array of the invention.

Operational amplifiers and capacitors are integrated into the pixel structure of the invention, and these circuits certainly reduce the fill factor of the photosensitive region of the photodiode. To overcome this problem, the present invention suggests a layout as shown in FIG. 6 and suitable for this pixel structure. Here, each square has a central distance of P. the hatched squares are photosensitive regions of the photodiode, while the laterally adjacent white squares with the same size are locations where the operational amplifier and capacitor layout are disposed (are called as circuitry regions). Accordingly, each hatched square and a laterally adjacent white square constitute a layout of a pixel. Pixels of the odd column are not laterally adjacent to those of the even column. The pixels of the even column entirely locate below the pixels of the odd column. The photosensitive region of pixels of the even column is aligned with the circuitry region of the pixels of the odd column. Except for the first column, the photosensitive region of pixels of the odd column is aligned with the circuitry region of the pixels of the even column. Consequently, along a direction perpendicular to the scanning direction (that is, the length direction of the sensor array), a photosensitive region of which the fill factor is almost 100% is disposed at every distance of P. By using such layout, the influence of the circuit portion of the pixel on the fill factor of the photosensitive regions is decreased without decreasing an equivalent pixel central distance, and almost 100% of the fill factor can be formed. Only a constant time difference N×TL exists between the output of the odd and even columns of pixels. This difference may be removed by simply processing output digital signals and this will not burden post circuits.

Figure 7:
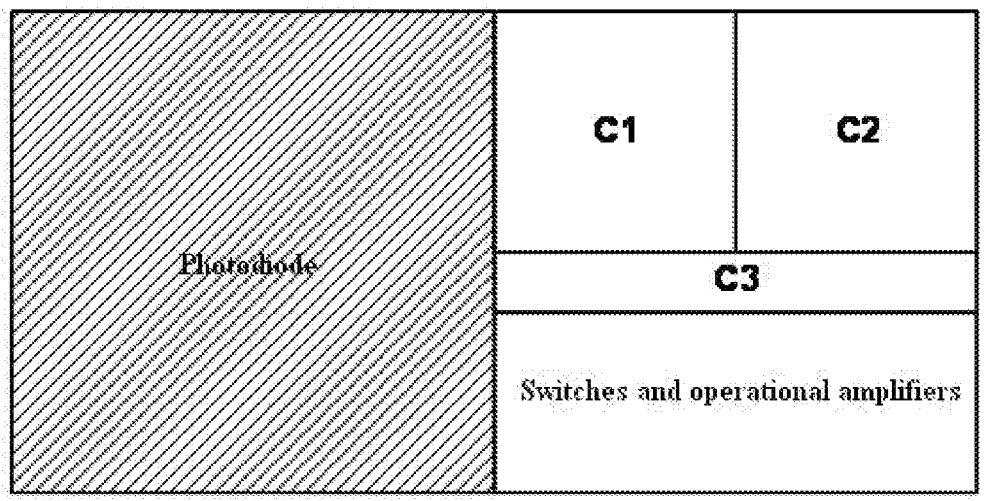
FIG. 7 shows an embodiment schematic view of a single pixel layout of the current invention.

To further illustrate the objects, technical solution and advantages of the invention, a detailed description of the embodiments of the invention will be provided. In one embodiment, the length of the sensor is 1024 pixels, the levels of the TDI are 50, the scanning frequency is 100 KHz, the central distance of pixel photosensitive region is 15 μm, and a Cyclic ADC with a resolution of 10 bit and conversion rate of 100 KHz is used as a column-parallel on-chip ADC. The layout of an individual pixel is shown in FIG. 7. The photodiode has the size of 15 μm×15 μm, capacitors C1, C2 and C3, switches and operational amplifier are all placed into a 15 μm×15 μm sized layout. Here, the size of the capacitors C1, C2 is both 7.5 μm×7.5 μm, the capacitor C3 has the size of 2.5 μm×15 μm, the rest area is for placing the switches and operational amplifier. If the capacitors are realized by a MIM capacitor with a unit area capacitance of 2 fF/μm$^2$, then the capacitance value of the capacitors C1, C2 will be about 112.5 fF, while that of the capacitor C3 will be about 75 fF. Moreover, MIM is generally made of an upper layer of metal and as a result, transistors and the lower layer of metal wiring may be positioned below the capacitors. As such, part of switches and operational amplifiers may be disposed into the space below the capacitors to make full use of the space. The length of the sensor pixel array is 15 μm×1024=15360 μm, height is 15 μm×50×2=1500 μm, and equivalent photosensitive region central distance is 15 μm. For a scanning frequency of 100 KHz, the transit time $T_L$ of the sensor is 10 μs, including 9 μs of $T_{int}$ and 1 μs of pixel resetting time. The conversion rate of in-chip column-parallel ADC is 100 KHz which meets the requirement of readout speed. During the period of sampling the previous pixel output by each pixel, the root mean square value of the introduced thermal noise is $\sqrt{kT/C_1}\approx 192\mu V$. Accordingly, after accumulation of TDI of 50 levels, the root mean square value of the introduced total thermal noise is $\sqrt{50kT/C_1}\approx 1.36$ mV. The reference voltage $V_{ref}$ of the pixel may be 1V. If the maximum voltage output by the pixel is 2.6V, the maximum signal amplitude output by the pixels after accumulation of 50 levels is 1.6V. If only thermal noise caused during the readout process is considered, the maximum SNR of the output signals is 20 log(1.6V/1.36 mV)=61.4 dB, satisfying the SNR requirement of ADC of 10-bit resolution.

What is claimed is:

1. A high scanning frequency CMOS-TDI image sensor, comprising:
    a plurality of cascaded pixels, each pixel of the plurality of cascaded pixels comprising:
        an input end;
        an output end;
        a photodiode comprising an anode and a cathode;
        an operational amplifier comprising a negative input end, a positive input end, and an output end;
        a first integration capacitor (C1) and a second integration capacitor (C2), the first integration capacitor and the second integration capacitor having equal capacitance and each comprising a first electrode and a second electrode;
        an offset voltage removing capacitor (C3) comprising a first electrode and a second electrode; and
        a plurality of switches (S1-S10) controlled by a plurality of clocks, each switch of the plurality of switches comprising a first end and a second end;
        wherein the anode is connected to a zero-voltage ground wire and the cathode is connected to an the first end of a first switch (S9) of the plurality of switches, the second end of the first switch is connected to a reference voltage (Vref), the first electrode of the offset voltage removing capacitor is connected to the cathode and the second electrode of the offset voltage removing capacitor is connected to the negative input end, a second switch (S10) of the plurality of switches is connected between the negative input end and the output end of the operational amplifier in series, the positive input end is connected to the reference voltage, the first electrode of the first integration capacitor is connected to the first end of a third switch (S1) of the plurality of switches and the first end of a fourth switch (S3) of the plurality of switches, the second end of the third switch is connected to the reference voltage, the second end of the fourth switch is connected to the cathode, the second electrode of the first integration capacitor is connected to the first end of a fifth switch (S2) of the plurality of switches and the first end of a sixth switch (S4) of the plurality of switches, the second end of the fifth switch is connected to the input end of the pixel, the second end of the sixth switch is connected to the output end of the pixel, the first electrode of the second integration capacitor is connected to the first end of a seventh switch (S5) of the plurality of switches and the first end of an eighth switch (S7) of the plurality of switches, the second end of the seventh switch is connected to the reference voltage, the second end of the eighth switch is connected to the cathode, the first electrode of the second integration capacitor is connected to the first end of a ninth switch (S6) of the plurality of switches and the first end of a tenth switch (S8) of the plurality of switches, the second end of the ninth switch is connected to the input end of the pixel, and the second end of the tenth switch is connected to the output end of the pixel;

wherein:

the plurality of cascaded pixels comprises N pixels, where N is an integer>2;

the input end of each of a second pixel (pixel 2) through an $N^{th}$ pixel of the plurality of cascaded pixels is connected to the output end of an immediately-preceding adjacent pixel of the plurality of cascaded pixels;

the input end of a first pixel (pixel 1) of the plurality of cascaded pixels is connected to the reference voltage; and the output end of the operational amplifier of an Nth pixel of the plurality of cascaded pixels is a readout end for the plurality of cascaded pixels and is connected to a column-parallel analog-to-digital converter through a readout switch.

2. The high scanning frequency CMOS-TDI image sensor according to claim 1, wherein:

the first switch and the second switch are controlled by a first clock (rst) of the plurality of clocks;

the third switch and the fifth switch are controlled by a second clock (clk1') of the plurality of clocks;

the fourth switch and the sixth switch are controlled by a third clock (clk2) of the plurality of clocks;

the seventh switch and the ninth switch are controlled by a fourth clock (clk2') of the plurality of clocks;

the eighth switch and the tenth switch are controlled by a fifth clock (clk1) of the plurality of clocks;

the readout switch is controlled by a sixth clock (Read); and each pixel of the plurality of cascaded pixels samples a signal at the first input end of the pixel, adds the signal sampled at the first input end of the pixel to a photocurrent integration signal of the photodiode generated during an exposure period of the pixel to yield an accumulation value, and outputs the accumulation value.

3. The high scanning frequency CMOS-TDI image sensor according to claim 2, wherein:

in an initializing state, when the first clock, second clock, and fourth clock are high and the third clock and the fifth clock are low, the voltage at the input end and the voltage at the output end of each pixel of the plurality of cascaded pixels are both the reference voltage;

after the initializing state, each pixel of the plurality of cascaded pixels is subject to a first exposure period when the second clock and the fifth clock are high and the first clock, third clock, and fourth clock are low, the first integration capacitor of each pixel of the plurality of cascaded pixels collects the voltage at the input end of the pixel, and simultaneously with the collection of the first integration capacitor, the second integration capacitor integrates a photocurrent signal of the photodiode;

after the first exposure period, each pixel of the plurality of cascaded pixels is reset, when the first clock is high and the second clock, third clock, fourth clock, and fifth clock are low;

after reset, each pixel of the plurality of cascaded pixels is subject to a second exposure period, when the third clock and fifth clock are high and the second clock and the fifth clock are low, the second integration capacitor of each of the second pixel through the $N^{th}$ pixel collects a voltage at the output end of an immediately-preceding pixel, and simultaneously with the collection of the second capacitor, the first integration capacitor of each pixel of the plurality of cascaded pixels integrates a photocurrent signal of the photodiode;

after an $N^{th}$ exposure period, the voltage at the output end of the $N^{th}$ pixel is a result of N times integration accumulation; and the column-parallel analog-to-digital converter outputs the voltage at the output end of the $N^{th}$ pixel after the $N^{th}$ exposure period when the sixth clock is high.

4. The high scanning frequency CMOS-TDI image sensor according to claim 1, wherein in each pixel of the plurality of cascaded pixels:

a photosensitive region of the photodiode is a square with a central distance;

a circuitry region comprising the operational amplifier, the plurality of switches and the first and second integration capacitors, is disposed immediately, laterally adjacent to the photosensitive region; and wherein:

pixels of the plurality of cascaded pixels of an odd column are not immediately, laterally adjacent to pixels of the plurality of cascaded pixels of an even column;

the pixels of the even column are entirely located vertically below the pixels of the odd column; and the photosensitive regions of the pixels of the even column are aligned with the circuitry regions of the pixels of the odd column, except for a first column where the photosensitive regions of the pixels of the odd column are aligned with the circuitry regions of the pixels of the even column.

* * * * *